(12) United States Patent
Iwata et al.

(10) Patent No.: US 12,472,800 B2
(45) Date of Patent: Nov. 18, 2025

(54) REFRIGERATION CYCLE DEVICE FOR VEHICLE

(71) Applicant: DAIKIN INDUSTRIES, LTD., Osaka (JP)

(72) Inventors: Ikuhiro Iwata, Osaka (JP); Eiji Kumakura, Osaka (JP); Tetsushi Tsuda, Osaka (JP); Shinjiro Domi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 61 days.

(21) Appl. No.: 18/476,790

(22) Filed: Sep. 28, 2023

(65) Prior Publication Data
US 2024/0017595 A1 Jan. 18, 2024

Related U.S. Application Data

(63) Continuation of application No. PCT/JP2022/016181, filed on Mar. 30, 2022.

(30) Foreign Application Priority Data

Mar. 31, 2021 (JP) ................................ 2021-061761

(51) Int. Cl.
B60H 1/00 (2006.01)
F25B 5/04 (2006.01)
(Continued)

(52) U.S. Cl.
CPC .......... B60H 1/00899 (2013.01); F25B 5/04 (2013.01); F25B 6/04 (2013.01); F25B 9/006 (2013.01); B60H 2001/00942 (2013.01)

(58) Field of Classification Search
CPC ...... B60H 1/00899; B60H 2001/00942; B60H 1/00907; B60H 2001/00935;
(Continued)

(56) References Cited

U.S. PATENT DOCUMENTS

2004/0074246 A1 4/2004 Kurata et al.
2004/0148953 A1* 8/2004 Kurata ............... B60H 1/00735
62/324.1
(Continued)

FOREIGN PATENT DOCUMENTS

AU 2011272696 A1 * 1/2013 ............... C09K 5/04
EP 2128550 B1 * 1/2018 ............ F24F 1/0059
(Continued)

OTHER PUBLICATIONS

Extended European Search Report issued in corresponding European Patent Application No. 22781147.8, dated Aug. 27, 2024 (13 pages).
(Continued)

Primary Examiner — Kun Kai Ma
(74) Attorney, Agent, or Firm — Osha Bergman Watanabe & Burton LLP

(57) ABSTRACT

A refrigeration cycle device for a vehicle includes a refrigerant circuit, in which a zeotropic refrigerant mixture is circulated, including a utilization heat exchanger including a first heat exchange portion and a second heat exchange portion disposed in series with the first heat exchange portion in a direction in which the zeotropic refrigerant mixture flows in the refrigerant circuit. The first heat exchange portion is disposed on an upstream side of the second heat exchange portion in a direction in which the zeotropic refrigerant mixture flows when the utilization heat exchanger functions as an evaporator of the zeotropic refrigerant mixture.

11 Claims, 6 Drawing Sheets

(51) Int. Cl.
*F25B 6/04* (2006.01)
*F25B 9/00* (2006.01)

(58) Field of Classification Search
CPC . B60H 1/3227; F25B 5/04; F25B 6/04; F25B 9/006; F25B 31/006; F25B 41/39; F25B 2313/021; F25B 2313/0234; F25B 2313/0254; F25B 2313/02732; F25B 2313/02742; F25B 13/00
See application file for complete search history.

(56) References Cited

U.S. PATENT DOCUMENTS

| | | | |
|---|---|---|---|
| 2006/0016203 A1* | 1/2006 | Hayashi | F25B 31/004 62/157 |
| 2006/0107672 A1* | 5/2006 | Oshitani | F25B 41/00 62/170 |
| 2006/0207285 A1* | 9/2006 | Oshitani | F25B 9/008 62/500 |
| 2007/0209789 A1* | 9/2007 | Oomura | F25B 47/02 62/229 |
| 2008/0028782 A1* | 2/2008 | Tilton | C09K 5/041 257/E23.088 |
| 2017/0284714 A1* | 10/2017 | Ishibashi | F25D 23/12 |
| 2019/0168579 A1* | 6/2019 | Kim | B60H 1/323 |
| 2020/0392389 A1 | 12/2020 | Itano et al. | |
| 2021/0309902 A1 | 10/2021 | Kumakura et al. | |

FOREIGN PATENT DOCUMENTS

| | | | | |
|---|---|---|---|---|
| JP | H05178072 A | | 7/1993 | |
| JP | H07-294047 A | | 11/1995 | |
| JP | 2002029242 A | * | 1/2002 | |
| JP | 2002240544 A | * | 8/2002 | |
| JP | 2002326512 A | * | 11/2002 | |
| JP | 2004-136851 A | | 5/2004 | |
| JP | 3718659 B2 | * | 11/2005 | ......... B60H 1/00342 |
| JP | 2007-240128 A | | 9/2007 | |
| JP | 2016-124474 A | | 7/2016 | |
| JP | 2020-40429 A | | 3/2020 | |
| WO | WO-0115922 A1 | * | 3/2001 | ......... B60H 1/00007 |
| WO | 2020/256131 A1 | | 12/2020 | |

OTHER PUBLICATIONS

International Search Report issued in corresponding International Application No. PCT/JP2022/016181 mailed Jun. 21, 2022 (2 pages).
International Preliminary Report on Patentability issued in corresponding International Application No. PCT/JP2022/016181, mailed Oct. 12, 2023 (9 pages).

* cited by examiner

REFRIGERATION CYCLE DEVICE FOR VEHICLE

BACKGROUND

Technical Field

The present disclosure relates to a refrigeration cycle device for a vehicle.

Description of the Related Art

There is a refrigeration cycle device for a vehicle that performs a refrigeration cycle to air-condition the inside of a vehicle, which is a space to be air-conditioned.

For example, in a refrigeration cycle device described in PTL 1 (Japanese Unexamined Patent Application Publication No. 2016-124474), it is proposed to employ, as a refrigerant, a zeotropic refrigerant mixture whose saturation temperature increases with the increase in dryness.

SUMMARY

A refrigeration cycle device for a vehicle according to one or more embodiments includes a refrigerant circuit. The refrigerant circuit has a utilization heat exchanger. The utilization heat exchanger includes a first heat exchange portion and a second heat exchange portion. A zeotropic refrigerant mixture is circulated in the refrigerant circuit. The first heat exchange portion and the second heat exchange portion are arranged in series with each other in a flow of the refrigerant in the refrigerant circuit. The first heat exchange portion is positioned on the upstream side of the second heat exchange portion in a flow direction of the refrigerant when the utilization heat exchanger is caused to function as an evaporator of the refrigerant.

DESCRIPTION OF THE EMBODIMENTS

Figure 1:
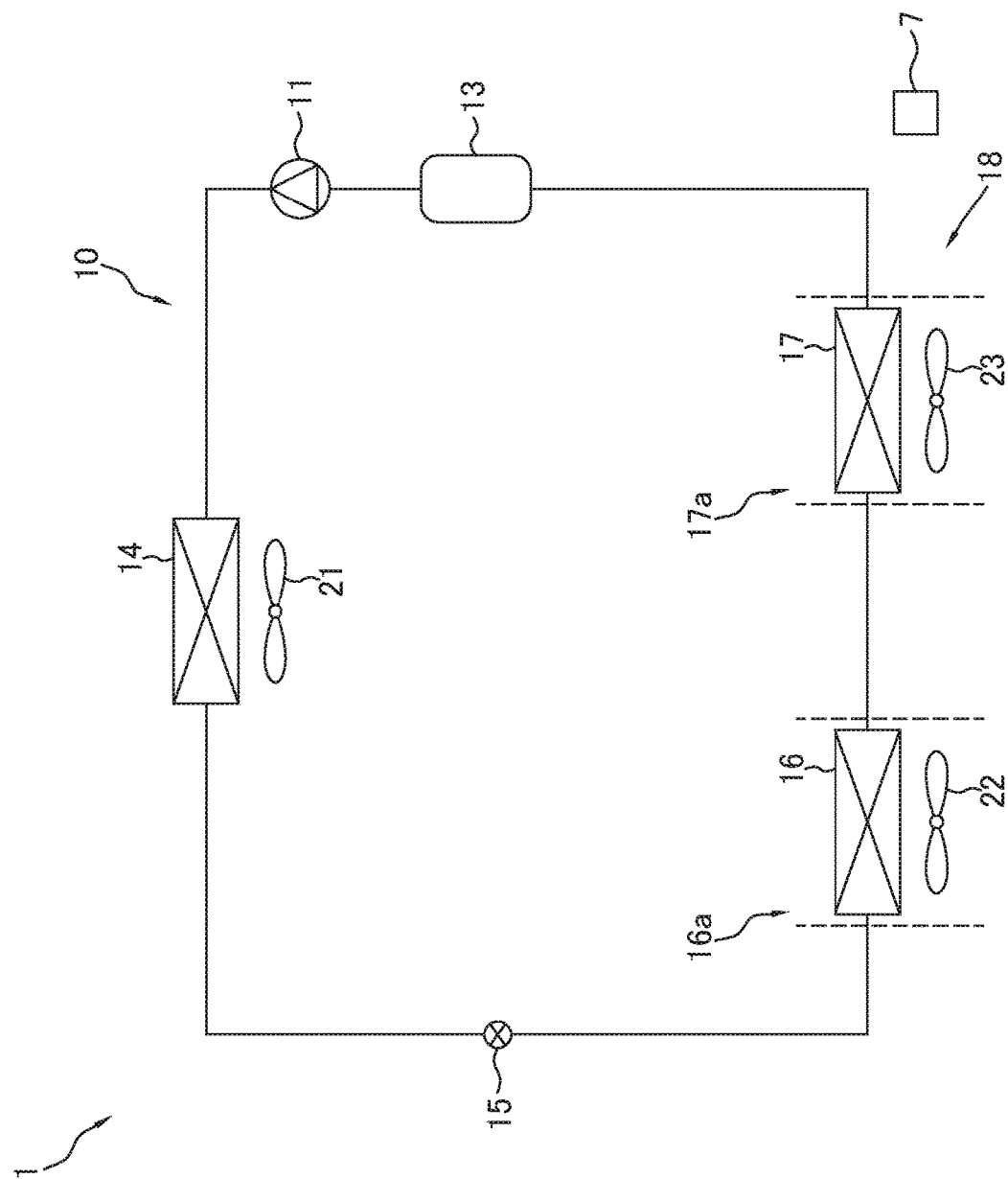
FIG. 1 is an overall configuration diagram of a refrigeration cycle device for a vehicle according to a first example.

In embodiments of a refrigeration cycle device for a vehicle described below, a zeotropic refrigerant mixture is used as a working medium.

The zeotropic refrigerant mixture may be any one of: (a) a refrigerant mixture containing at least HFO (hydrofluoroolefin) 1132, (b) a refrigerant mixture containing at least HFO1123, and (c) a refrigerant mixture containing at least an HFO-based refrigerant and an HFC (hydrofluorocarbon)-based refrigerant.

(a) The refrigerant mixture containing at least HFO1132 may be a working medium containing trans-1,2-difluoroethylene (HFO-1132(E)) and 2,3,3,3-tetrafluoropropene (HFO-1234yf). Such a working medium may be a working medium in which the content ratio of HFO-1132(E) is 12.1 to 72.0 mass % and the content ratio of HFO-1234yf is 87.9 to 28.0 mass % relative to the total mass of HFO-1132 (E) and HFO-1234yf.

(b) The refrigerant mixture containing at least HFO1123 may be a working medium containing trifluoroethylene (HFO-1123) and 2,3,3,3-tetrafluoropropene (HFO-1234yf). Such working mediums are described in the following Example b1 to Example b14.

The working medium of the Example b1 includes a medium b1-1 and a medium b1-2. In the medium b1-1, the ratio of the total amount of HFO-1123 and HFO-1234yf relative to the total amount of the medium b1-1 is 70 to 100 mass %, and the ratio of HFO-1123 relative to the total amount of HFO-1123 and HFO-1234yf is 35 to 95 mass %. Further, the medium b1-1 contains at least one selected from saturated hydrofluorocarbons and hydrofluorocarbons having carbon-carbon double bonds (excluding HFO-1123 and HFO-1234yf) in an amount of 0 to 30 mass % relative to the total amount of the medium b1-1. The medium b1-2 contains at least one selected from the group consisting of carbon dioxide, hydrocarbon, chlorofluoroolefin (CFO), and hydrochlorofluoroolefin (HCFO).

The working medium of Example b2 is a working medium in Example b1, in which the ratio of the sum of the HFO-1123 and HFO-1234yf relative to the total amount of the medium b1-1 is to 100 mass %.

The working medium of Example b3 is a working medium in Example b1 or Example b2, in which the ratio of the HFO-1123 relative to the sum of the HFO-1123 and HFO-1234y is 40 to 95 mass %.

The working medium of Example b4 is a working medium in any one of Example b1, Example b2, and Example b3, in which the ratio of the HFO-1123 relative to the total amount of the medium b1-1 is 70 mol % or less.

The working medium of Example b5 is a working medium in any one of Example b1, Example b2, Example b3, and Example b4, in which the hydrofluorocarbon having carbon-carbon double bonds is at least one selected from the group consisting of 1,-2-difluoroethylene, 2-fluoropropene, 1,1,2-trifluoropropene, trans-1,2,3,3,3-pentafluoropropene, cis-1,2,3,3,3-pentafluoropropene, trans-1,3,3,3-tetrafluoropropene, cis-1,3,3,3-tetrafluoropropene, and 3,3,3-trifluoropropene. The working medium of Example b6 is a working medium in any one of Example b1, Example b2, Example b3, Example b4, and Example b5, in which the hydrofluorocarbon having carbon-carbon double bonds is trans-1,3,3,3-tetrafluoropropene.

The working medium of Example b7 is a working medium in any one of Example b1, Example b2, Example b3, Example b4, Example b5, and Example b6, in which the saturated hydrofluorocarbon is at least one selected from the group consisting of difluoromethane, 1,1-difluoroethane, 1,1,1-trifluoroethane, 1,1,2,2-tetrafluoroethane, 1,1,1,2-tetrafluoroethane, and pentafluoroethane.

The working medium of Example b8 is a working medium in any one of Example b1, Example b2, Example b3, Example b4, Example b5, Example b6, and Example b7, in which the saturated hydrofluorocarbon is at least one selected from the group consisting of difluoromethane, 1,1,1,2-tetrafluoroethane, and pentafluoroethane.

The working medium of Example b9 is a working medium in Example b8, in which the saturated hydrofluorocarbon is difluoromethane, the ratio of HFO-1123, the ratio of HFO-1234yf, and the ratio of difluoromethane are respectively 30 to 80 mass %, 40 mass % or less, and 30 mass % or less relative to the sum of HFO-1123, HFO-1234yf, and difluoromethane, and the ratio of HFO-1123 relative to the total amount of the medium b1-1 is 70 mol % or less.

The working medium of Example b10 is a working medium containing HFO-1123, difluoromethane (R32), and 1,3,3,3-tetrafluoropropene (HFO-1234ze), in which the ratio of the sum of HFO-1123, R32, and HFO-1234ze relative to the total amount of the working medium of Example b10 is more than 90 mass % and equal to or less than 100 mass %, and the ratio of HFO-1123, the ratio of R32, and the ratio of HFO-1234ze are respectively more than 0 mass % and equal to or less than 50 mass %, more than 0 mass % and equal to or less than 40 mass %, and equal to or more than 40 mass % and equal to or less than 90 mass %, relative to the sum of HFO-1123, R32, and HFO-1234ze.

The working medium of Example b11 is a working medium in Example b10, in which the ratio of HFO-1123, the ratio of R32, and the ratio of HFO-1234ze are respectively more than 0 mass % and equal to or less than 20 mass %, more than 0 mass % and equal to or less than 20 mass %, and equal to or more than 65 mass % and equal to or less than 90 mass %, relative to the sum of HFO-1123, R32, and HFO-1234ze.

The working medium of Example b12 is a working medium in Example b10 or Example b11 in which the HFO-1234ze contains trans-1,3,3,3-tetrafluoropropene in an amount of 60 mass % or more.

The working medium of Example b13 is a working medium in any one of Example b10, Example b11, and Example b12, which further contains an HFO-1234yf.

The working medium of Example b14 is a working medium in any one of Example b10, Example b11, and Example b12, which is composed of HFO-1123, R32, and HFO-1234ze.

(c) The refrigerant mixture containing at least an HFO-based refrigerant and an HFC-based refrigerant may be R454C. R454C is a working medium containing difluoromethane (R32) and 2,3,3,3-tetrafluoropropene (HFO-1234yf), in which the ratio of R32 is 21.5% and the ratio of HFO-1234yf is 78.5% relative to the total amount of the working medium.

Note that the refrigeration cycle device for a vehicle described below may be mounted on an electric vehicle.

(1) First Example

Figure 2:
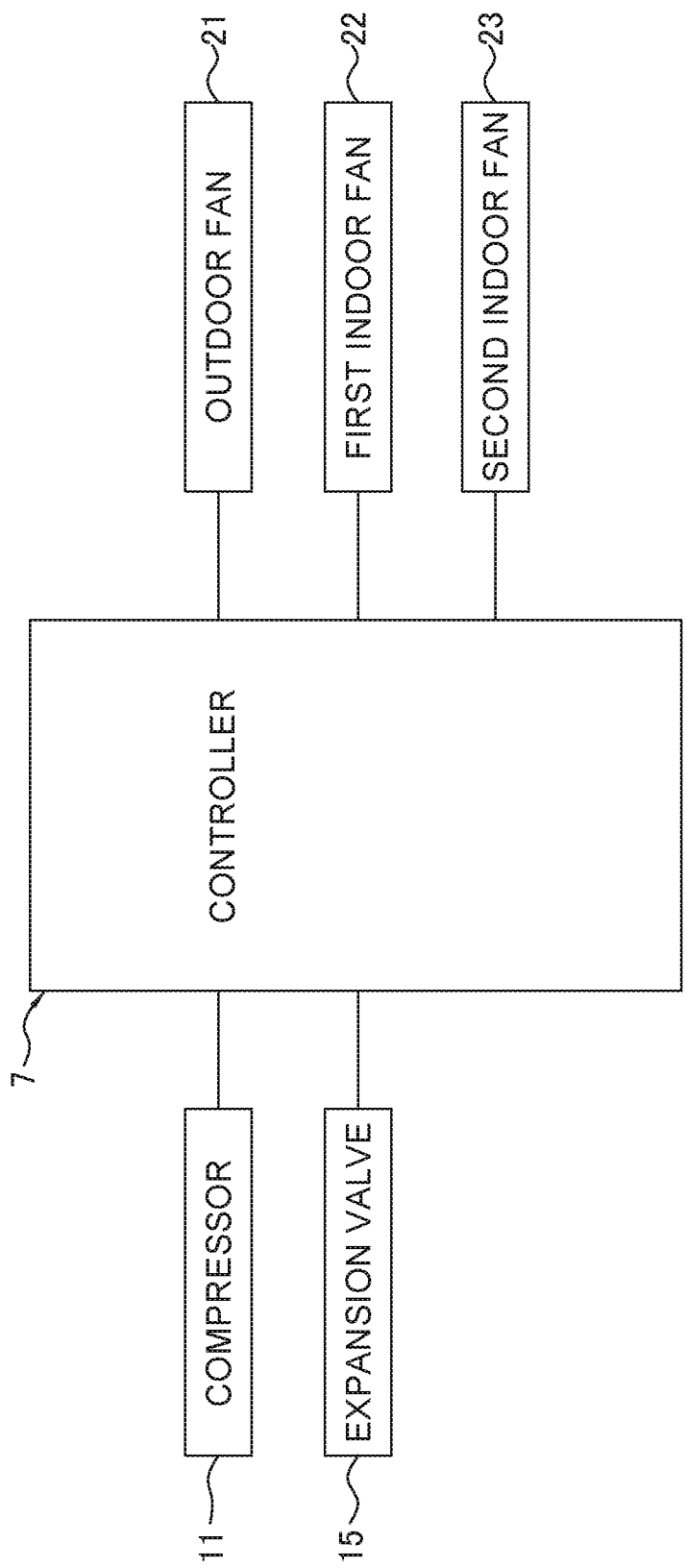
FIG. 2 is a functional block diagram of the refrigeration cycle device for a vehicle according to the first example.

FIG. 1 is a schematic configuration diagram of a refrigeration cycle device for a vehicle 1 according to a first example. FIG. 2 is a functional block diagram of the refrigeration cycle device for a vehicle 1 according to the first example.

The refrigeration cycle device for a vehicle 1 is a device used for air-conditioning the inside of a vehicle by performing a vapor compression refrigeration cycle operation.

The refrigeration cycle device for a vehicle 1 mainly includes a refrigerant circuit 10, an outdoor fan 21, a first indoor fan 22, a second indoor fan 23, a first air flow path 16a, a second air flow path 17a, and a controller 7.

The refrigerant circuit 10 is filled with the above-described zeotropic refrigerant mixture. The refrigerant circuit includes a compressor 11, an outdoor heat exchanger 14, an expansion valve 15, an indoor heat exchanger 18 including a first indoor heat exchanger 16 and a second indoor heat exchanger 17, and an accumulator 13. In the refrigerant circuit 10, the compressor 11, the outdoor heat exchanger 14, the expansion valve 15, the first indoor heat exchanger 16, the second indoor heat exchanger 17, and the accumulator 13 are connected in this order, and the refrigerant circulates therein.

The compressor 11 is a positive-displacement compressor driven by a compressor motor. The compressor motor is driven by electric power supplied via an inverter device. The operating capacity of the compressor 11 can be changed by varying the driving frequency, which is the number of rotations of the compressor motor. The discharge side of the compressor 11 is connected to the outdoor heat exchanger 14, and the suction side of the compressor 11 is connected to the accumulator 13. The compressor 11 is accommodated below the hood in an engine room in which the motor of the electric vehicle is loaded.

The outdoor heat exchanger 14 is configured to include a large number of flat-shaped heat transfer tubes provided with a plurality of internal flow paths, and a large number of fins joined to the large number of heat transfer tubes. In one or more embodiments, the outdoor heat exchanger 14 is disposed in the engine room. The outdoor heat exchanger 14 functions as a condenser that dissipates the heat of the refrigerant passing therethrough so as to condense the refrigerant.

The outdoor fan 21 generates an air flow for supplying outdoor air to the outdoor heat exchanger 14 disposed in the engine room. As a result, the refrigerant and the air exchange heat in the outdoor heat exchanger 14.

The expansion valve 15 is configured by an electronic expansion valve whose valve opening degree can be adjusted. The expansion valve 15 is provided between the outdoor heat exchanger 14 and the first indoor heat exchanger 16 in the refrigerant circuit 10.

The first indoor heat exchanger 16 is configured to include, for example, a large number of flat-shaped heat transfer tubes provided with a plurality of internal flow paths, and a large number of fins joined to the large number of heat transfer tubes. In one or more embodiments, the first indoor heat exchanger 16 is provided in the first air flow path 16a for taking air outside the vehicle into the vehicle in order to ventilate the vehicle. The first indoor fan 22 is provided in the first air flow path 16a. When the first indoor fan 22 is driven, an air flow from the outside of the vehicle toward the inside of the vehicle is formed in the first air flow path 16a. The first indoor heat exchanger 16 functions as an evaporator of the refrigerant that exchanges heat between the refrigerant and the air outside the vehicle that passes through the first air flow path 16a and that has not yet been taken into the vehicle. Thus, cooled fresh air outside the vehicle can be taken into the vehicle.

Similarly to the first indoor heat exchanger 16, the second indoor heat exchanger 17 is configured to include, for example, a large number of flat-shaped heat transfer tubes provided with a plurality of internal flow paths, and a large number of fins joined to the large number of heat transfer tubes. In one or more embodiments, the second indoor heat exchanger 17 is connected in series on the downstream side in the refrigerant flow with respect to the first indoor heat exchanger 16 in the refrigerant circuit 10. In one or more embodiments, the second indoor heat exchanger 17 is provided in the second air flow path 17a which is a flow path for circulating the air in the vehicle and whose inlet and outlet communicate with the inside of the vehicle. The second indoor fan 23 is provided in the second air flow path 17a. When the second indoor fan 23 is driven, an air flow for circulating the air in the vehicle is formed in the second air flow path 17a. The second indoor heat exchanger 17 functions as an evaporator of the refrigerant that exchanges heat between the air passing through the second air flow path 17a and the refrigerant. Thus, the air inside the vehicle can be cooled.

The accumulator 13 is a refrigerant container connected to the suction side of the compressor 11.

The controller 7 controls the operation of each device constituting the refrigerant circuit 10. Specifically, the controller 7 includes a processor as a CPU provided for performing control, a memory, and the like.

In the refrigerant circuit 10 described above, the controller 7 controls each device to conduct a refrigeration cycle to thereby perform a cooling operation. Heating operation may be performed by using an electric heater (not shown).

In the cooling operation, the refrigerant discharged from the compressor 11 flows into the outdoor heat exchanger 14. In one or more embodiments, the driving frequency of the compressor 11 is controlled so that the compressor 11 can process the heat load of both the first indoor heat exchanger 16 and the second indoor heat exchanger 17. The refrigerant flowing into the outdoor heat exchanger 14 dissipates heat of the refrigerant so as to be condensed. Since the zeotropic refrigerant mixture is used as the refrigerant, a temperature glide in which the refrigerant temperature decreases as the refrigerant flows in the refrigerant flow direction also occurs in the outdoor heat exchanger 14. The refrigerant condensed in the outdoor heat exchanger 14 is decompressed when passing through the expansion valve 15 whose valve opening degree is controlled. In one or more embodiments, the opening degree of the expansion valve 15 is controlled such that the degree of superheating of the refrigerant sucked into the compressor 11 satisfies a predetermined condition. Part of the refrigerant that has passed through the expansion valve 15 evaporates in the first indoor heat exchanger 16. The refrigerant that has passed through the first indoor heat exchanger 16 further evaporates in the second indoor heat exchanger 17. Since the zeotropic refrigerant mixture is used as the refrigerant, a temperature glide in which the refrigerant temperature rises as the refrigerant flows in the refrigerant flow direction also occurs in the first indoor heat exchanger 16, and a temperature glide in which the refrigerant temperature further rises as the refrigerant flows in the refrigerant flow direction also occurs in the second indoor heat exchanger 17. Since the first indoor heat exchanger 16 is disposed on the upstream side of the second indoor heat exchanger 17 in the refrigerant flow, the temperature at which the refrigerant evaporates in the first indoor heat exchanger 16 is lower than the temperature at which the refrigerant evaporates in the second indoor heat exchanger 17. More specifically, the refrigerant temperature on the upstream side of the downstream-side end of the first indoor heat exchanger 16, which functions as an evaporator, is lower than the refrigerant temperature on the downstream side of the upstream-side end of the second indoor heat exchanger 17, which functions as an evaporator. The refrigerant that has passed through the second indoor heat exchanger 17 is sucked into the compressor 11 again via the accumulator 13.

In the refrigeration cycle device for a vehicle 1 of the first example described above, it is possible to effectively use the difference in temperature between the first indoor heat exchanger 16 having a relatively low evaporation temperature and the second indoor heat exchanger 17 having a relatively high evaporation temperature. Specifically, the first indoor heat exchanger 16 having a lower evaporation temperature is used for cooling the ventilation air from the outside of the vehicle where the heat load tends to be high, and the second indoor heat exchanger 17 having a higher evaporation temperature is used for cooling the circulation air inside the vehicle where the heat load tends to be relatively low, so that the heat load processing can be easily performed with sufficient performance, and each region can be effectively used.

(1-1) Modification 1A of First Example

Figure 3:
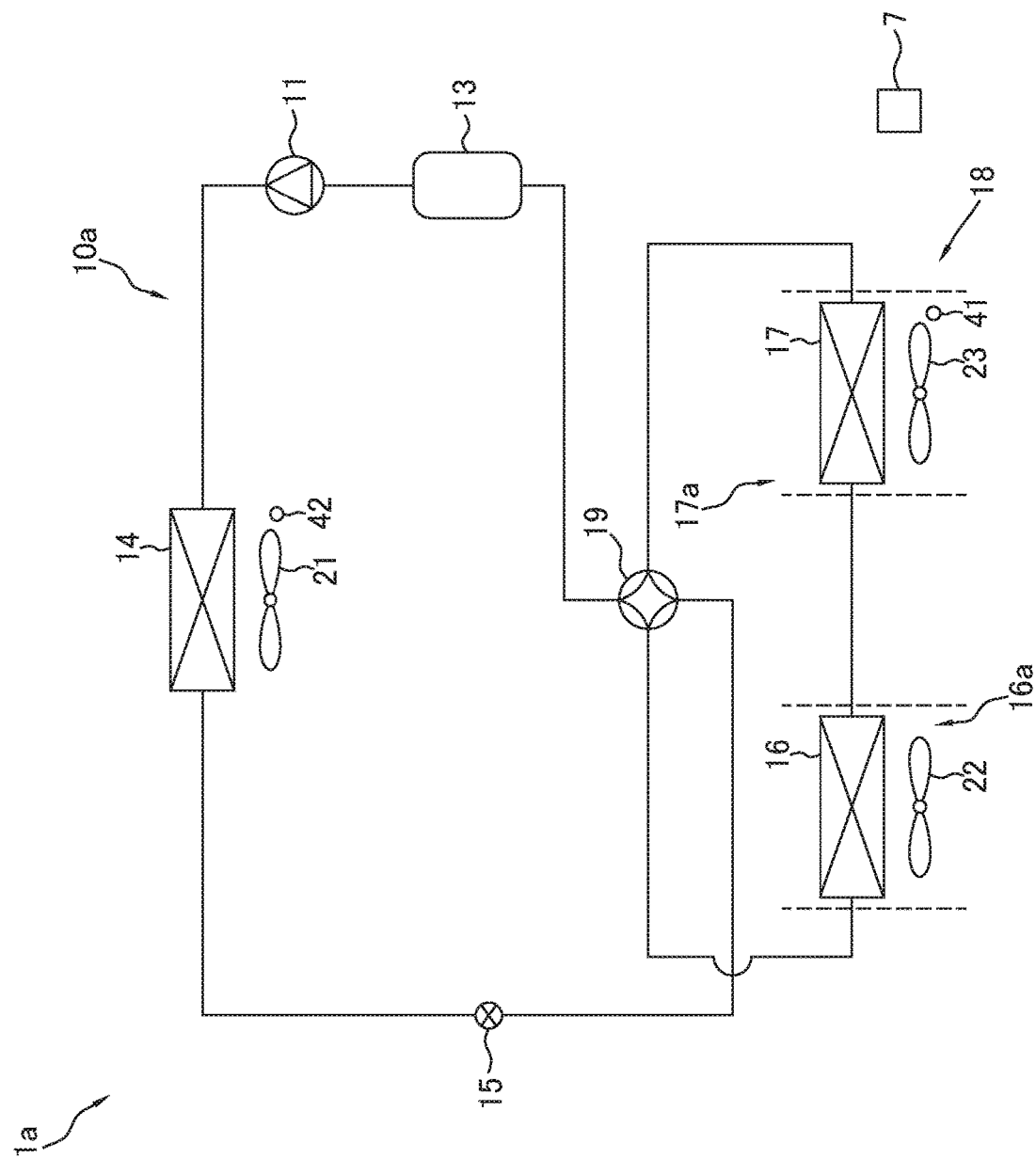
FIG. 3 is an overall configuration diagram of a refrigeration cycle device for a vehicle according to a modification of the first example.

FIG. 3 is a schematic configuration diagram of a refrigeration cycle device for a vehicle 1a according to a modification 1A of the first example.

The refrigeration cycle device for a vehicle 1a includes a refrigerant circuit 10a that is a refrigerant circuit in which a utilization-side switching portion 19 is further provided in the refrigerant circuit 10 of the refrigeration cycle device for a vehicle 1 described above.

The utilization-side switching portion 19 is a switching mechanism (example of a switch) that switches between a first utilization state in which a first indoor heat exchanger 16 is positioned on the upstream side of a second indoor heat exchanger 17, and a second utilization state in which the first indoor heat exchanger 16 is positioned on the downstream side of the second indoor heat exchanger 17, in the refrigerant flow direction in the refrigerant circuit 10a. Specifically, the utilization-side switching portion 19 is configured by a four-way switching valve that has first to fourth connection ports which are four connection ports, and that can switch the connection state between the connection ports. In the utilization-side switching portion 19, the first connection port is connected to the suction side of a compressor 11 via an accumulator 13, the second connection port is connected to an expansion valve 15, the third connection port is connected to an end of the first indoor heat exchanger 16 opposite the end on the second indoor heat exchanger 17 side, and the fourth connection port is connected to an end of the second indoor heat exchanger 17 opposite the end on the first indoor heat exchanger 16 side.

When the refrigeration cycle device for a vehicle 1a is connected as indicated by the solid line in FIG. 3 in the first utilization state, the refrigerant partially evaporated in the first indoor heat exchanger 16 further evaporates in the second indoor heat exchanger 17. In addition, in the second utilization state, by being connected as shown by the broken line in FIG. 3, the refrigerant partially evaporated in the second indoor heat exchanger 17 further evaporates in the first indoor heat exchanger 16.

Thus, in the first utilization state, the evaporation temperature in the first indoor heat exchanger 16 can be made relatively low and the evaporation temperature in the second indoor heat exchanger 17 can be made relatively high, and in the second utilization state, the evaporation temperature in the first indoor heat exchanger 16 can be made relatively high and the evaporation temperature in the second indoor heat exchanger 17 can be made relatively low. Thus, it is possible to change the temperature relationship between the first indoor heat exchanger 16 and the second indoor heat exchanger 17 to effectively use the indoor heat exchanger 18.

For example, when the inside of the vehicle is cooled, in a situation where the temperature inside the vehicle is higher than the temperature outside the vehicle, the heat load of circulating air inside the vehicle is larger than that of air outside the vehicle. In such a case, by controlling the utilization-side switching portion 19 to switch to the second utilization state, it is possible to sufficiently cool the high-temperature air inside the vehicle using the second indoor heat exchanger 17, which has a relatively low evaporation temperature. Further, thereafter, when the temperature inside the vehicle is sufficiently lowered and the temperature inside the vehicle becomes lower than the temperature outside the vehicle, so that the heat load of circulating air inside the vehicle becomes smaller than that of air outside the vehicle, the utilization-side switching portion 19 may be controlled to be switched to the first utilization state. Thus, the air outside the vehicle can be sufficiently cooled by using the first indoor heat exchanger 16 having a relatively low evaporation temperature.

As shown in FIG. 3, the temperature inside the vehicle may be detected by an in-vehicle temperature sensor 41, and the temperature outside the vehicle may be detected by an outside air temperature sensor 42. The in-vehicle temperature sensor 41 can be disposed, for example, on the upstream side in the air flow direction of the second indoor heat exchanger 17 in the second air flow path 17a. The outside air temperature sensor 42 can be disposed on the upstream side of the outdoor heat exchanger 14 in the air flow direction.

(1-2) Modification 1B of First Example

Figure 4:
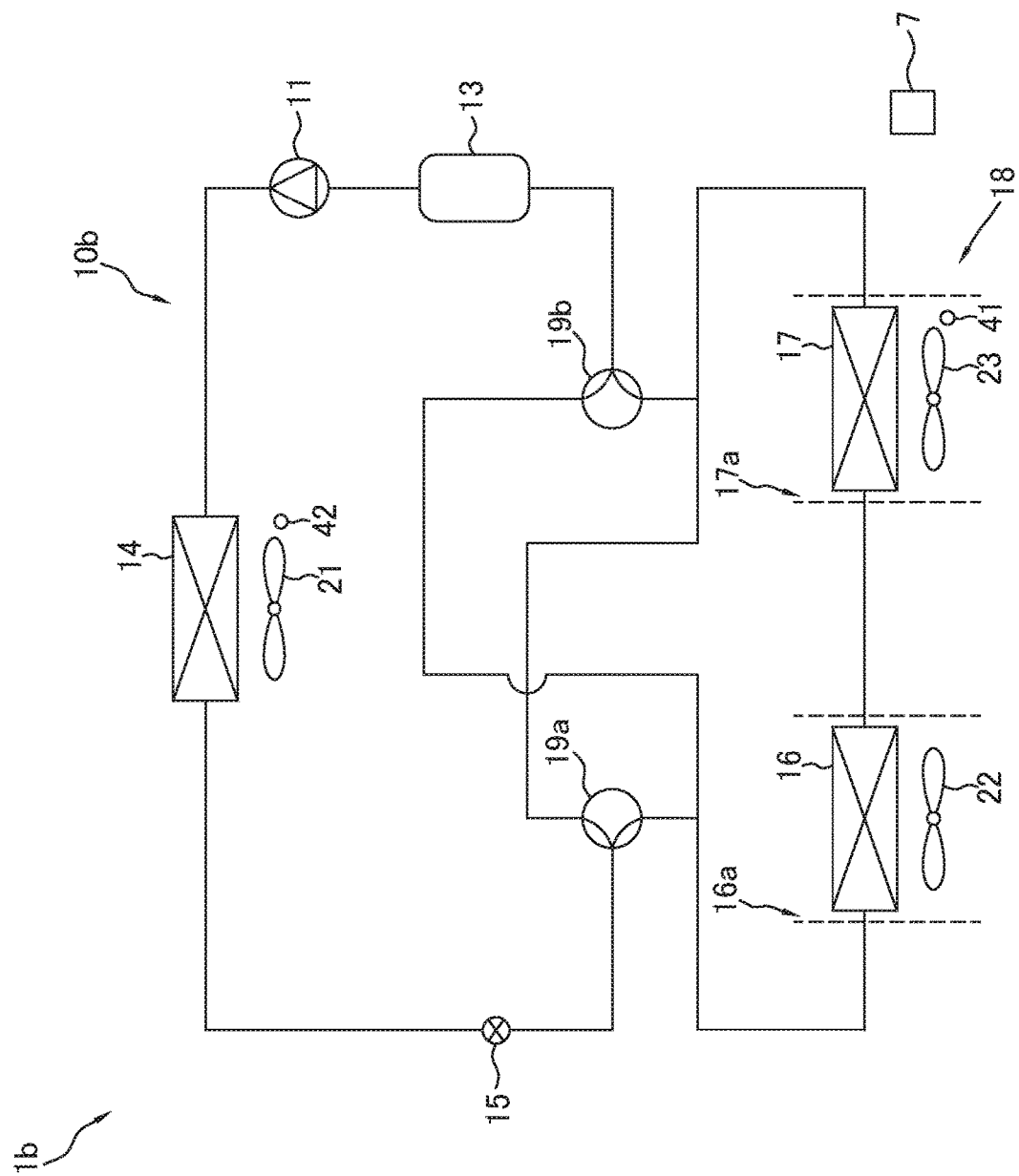
FIG. 4 is an overall configuration diagram of a refrigeration cycle device for a vehicle according to a modification of the first example.

FIG. 4 is a schematic configuration diagram of a refrigeration cycle device for a vehicle 1b according to a modification 1B of the first example.

The refrigeration cycle device for a vehicle 1b has a refrigerant circuit 10b, which is a refrigerant circuit provided with two three-way valves 19a and 19b, instead of the utilization-side switching portion 19 constituted by the four-way switching valves in the refrigerant circuit 10a of the refrigeration cycle device for a vehicle 1a described above.

The three-way valve 19a switches between a state in which an expansion valve 15 is connected to an end of a first indoor heat exchanger 16 opposite the end on a second indoor heat exchanger 17 side, and a state in which the expansion valve 15 is connected to an end of the second indoor heat exchanger 17 opposite the end on the first indoor heat exchanger 16 side.

The three-way valve 19b switches between a state in which the suction side of a compressor 11 is connected, via an accumulator 13, to the end of the first indoor heat exchanger 16 opposite the end on the second indoor heat exchanger 17 side, and a state in which the suction side of the compressor 11 is connected, via the accumulator 13, to the end of the second indoor heat exchanger 17 opposite the end on the first indoor heat exchanger 16 side.

In such a manner, even when two three-way valves 19a and 19b are used instead of the utilization-side switching portion 19 constituted by the four-way switching valve, the refrigeration cycle can be performed by switching between the first utilization state (see the solid lines of the three-way valves 19a and 19b) in which the first indoor heat exchanger 16 is connected to the upstream side of the second indoor heat exchanger 17 and the second utilization state (see the broken lines of the three-way valves 19a and 19b) in which the first indoor heat exchanger 16 is connected to the downstream side of the second indoor heat exchanger 17, as in the modification 1A.

(1-3) Modification 10 of First Example

In the first example and the modifications 1A and 1B, the refrigeration cycle devices for a vehicle 1, 1a, and 1b including the refrigerant circuits 10, 10a, and 10b, in which the indoor heat exchanger 18 functions as an evaporator of the refrigerant, have been described as examples.

On the other hand, the refrigeration cycle devices for a vehicle 1, 1a, and 1b may include, for example, a refrigerant circuit in which the indoor heat exchanger 18 functions as a condenser of the refrigerant. To be specific, in the refrigeration cycle devices for a vehicle 1, 1a, and 1b, the indoor heat exchanger 18 can function as a condenser of the refrigerant by replacing, in the refrigerant circuits 10, 10a, and 10b, the positions of the compressor 11 and the accumulator 13 with the position of the expansion valve 15.

In such a manner, the inside of the vehicle can be heated by causing the indoor heat exchanger 18 to function as a condenser of the refrigerant.

In the heating operation, the refrigerant discharged from the compressor 11 is sent to the indoor heat exchanger 18. Here, in the heating operation, the driving frequency of the compressor 11 is controlled so that the compressor 11 can process the heat load of both the first indoor heat exchanger 16 and the second indoor heat exchanger 17. Since the zeotropic refrigerant mixture is used as the refrigerant, the refrigerant flowing through the first indoor heat exchanger 16 and the second indoor heat exchanger 17 has a temperature glide in which the refrigerant temperature decreases as the refrigerant flows in the refrigerant flow direction. Of the first indoor heat exchanger 16 and the second indoor heat exchanger 17, the temperature at which the refrigerant condenses in the heat exchanger disposed on the upstream side of the refrigerant flow is higher than the temperature at which the refrigerant condenses in the heat exchanger disposed on the downstream side of the refrigerant flow. More specifically, the refrigerant temperature on the upstream side of the downstream-side end of the heat exchanger that functions as a condenser positioned on the upstream side of the refrigerant flow is higher than the refrigerant temperature on the downstream side of the upstream-side end of the heat exchanger that functions as a condenser positioned on the upstream side of the refrigerant flow. The refrigerant condensed in the indoor heat exchanger 18 in such a manner is decompressed when passing through the expansion valve 15 whose valve opening degree is controlled. In one or more embodiments, the opening degree of the expansion valve 15 is controlled such that the degree of superheating of the refrigerant sucked into the compressor 11 satisfies a predetermined condition. The refrigerant that has passed through the expansion valve 15 evaporates in the outdoor heat exchanger 14. Since the zeotropic refrigerant mixture is used as the refrigerant, a temperature glide in which the refrigerant temperature increases as the refrigerant flows in the refrigerant flow direction also occurs in the outdoor heat exchanger 14. The refrigerant that has passed through the outdoor heat exchanger 14 is sucked into the compressor 11 again via the accumulator 13.

In such a manner, since the temperature at which the refrigerant condenses is different between the first indoor heat exchanger 16 and the second indoor heat exchanger 17, the difference in condensation temperature can be effectively used by, for example, causing the heat exchanger positioned on the upstream side to process a large heating load, and causing the heat exchanger positioned on the downstream side to process a small heating load.

Further, when the positional relationship between the upstream and downstream sides of the first indoor heat exchanger 16 and the second indoor heat exchanger 17 functioning as condensers can be switched by the utilization-side switching portion 19 or the three-way valves 19a and 19b, the load processing can be performed in accordance with the relationship between the heat load of the air passing through the first air flow path 16a and the heat load of the air passing through the second air flow path 17a.

(2) Second Example

Figure 5:
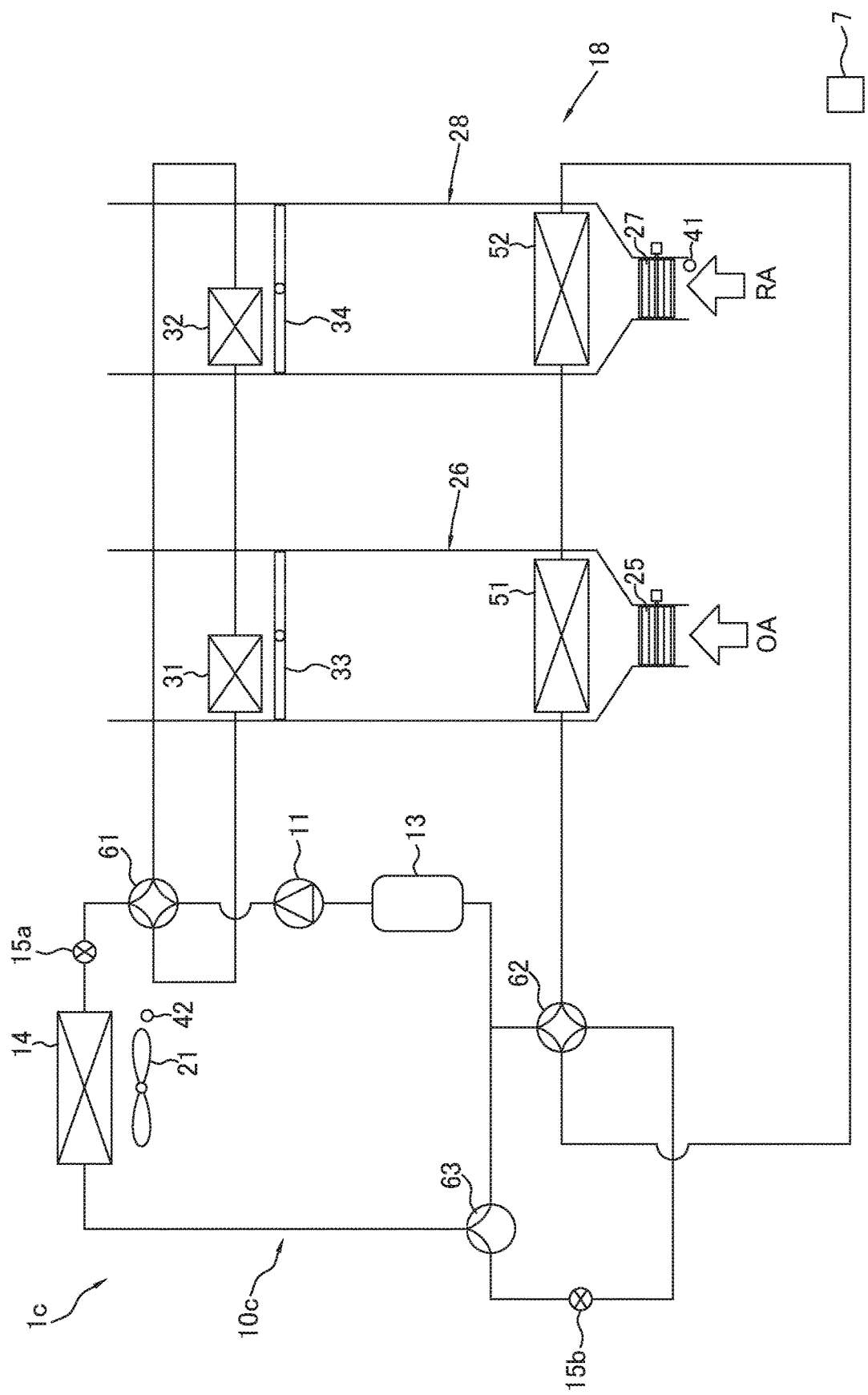
FIG. 5 is an overall configuration diagram of a refrigeration cycle device for a vehicle according to a second example.

FIG. 5 is a schematic configuration diagram of a refrigeration cycle device for a vehicle 1c according to a second example.

The refrigeration cycle device for a vehicle 1c is a device used for air-conditioning the inside of the vehicle by performing a vapor compression refrigeration cycle operation.

The refrigeration cycle device for a vehicle 1c mainly includes a refrigerant circuit 10c, an outdoor fan 21, a first indoor fan 25, a second indoor fan 27, a first air flow path 26, a second air flow path 28, and a controller 7.

The refrigerant circuit 10c is filled with the above-described zeotropic refrigerant mixture. The refrigerant circuit 10c includes a compressor 11, a first expansion valve 15a, a second expansion valve 15b, an outdoor heat exchanger 14, a first switching portion 61, a second switching portion 62, a third switching portion 63, and an indoor heat exchanger 18, in which the indoor heat exchanger 18 includes a first evaporator 51, a second evaporator 52, a first condenser 31, and a second condenser 32.

Note that in the second example, components denoted by the same reference numerals as those in the first example have the same specific configurations except for the connection relationship between devices, and therefore a description thereof will be omitted in some cases.

The first switching portion 61 is connected to the discharge side of the compressor 11.

The first condenser 31 and the second condenser 32 are directly connected to each other in the refrigerant flow direction of the refrigerant circuit 10c. The first condenser 31 and the second condenser 32 dissipate the heat of the refrigerant and condense the refrigerant.

The first switching portion 61 is a switching mechanism that switches the positional relationship between the first condenser 31 and the second condenser 32 in the refrigerant flow direction. To be specific, the first switching portion 61 switches between a first condenser connection state in which the first condenser 31 is positioned on the upstream side of the second condenser 32 and a second condenser connection state in which the first condenser 31 is positioned on the downstream side of the second condenser 32 in the refrigerant flow direction in the refrigerant circuit 10c. In one or more embodiments, the first switching portion 61 is configured by a four-way switching valve that has first to fourth connection ports which are four connection ports, and that can switch the connection state between the connection ports. In the first switching portion 61, the first connection port is connected to the discharge side of the compressor 11, the second connection port is connected to the first expansion valve 15a, the third connection port is connected to an end of the first condenser 31 opposite the end on the second condenser 32 side, and the fourth connection port is connected to an end of the second condenser 32 opposite the end on the first condenser 31 side.

The first expansion valve 15a is provided in the middle of a refrigerant flow path connecting the first switching portion 61 and the outdoor heat exchanger 14. The first expansion valve 15a is configured by an electronic expansion valve whose valve opening degree can be adjusted.

The outdoor heat exchanger 14 is provided between the first expansion valve 15a and the third switching portion 63, and may function as a condenser that condenses the refrigerant by dissipating heat from the refrigerant, or may function as an evaporator that evaporates the refrigerant, depending on the operating conditions. An air flow of outdoor air generated by the outdoor fan 21 passes through the outdoor heat exchanger 14.

The third switching portion 63 is provided on the downstream side in the refrigerant flow with respect to the outdoor heat exchanger 14. The third switching portion 63 is a three-way valve that switches between a connection state in which the refrigerant flowing out of the outdoor heat exchanger 14 is guided to the second expansion valve 15b and a connection state in which the refrigerant flowing out of the outdoor heat exchanger 14 is guided to the accumulator 13.

The second expansion valve 15b is provided in the middle of a refrigerant flow path that connects the second switching portion 62 and the third switching portion 63 and that is not connected to the accumulator 13. The second expansion valve 15b is configured by an electronic expansion valve whose valve opening degree can be adjusted.

The first evaporator 51 and the second evaporator 52 are directly connected to each other in the refrigerant flow direction of the refrigerant circuit 10c. The refrigerant evaporates in the first evaporator 51 and the second evaporator 52.

The second switching portion 62 is a switching mechanism that switches the positional relationship between the first evaporator 51 and the second evaporator 52 in the refrigerant flow direction. To be specific, the second switching portion 62 switches between a first evaporator connection state in which the first evaporator 51 is positioned on the upstream side of the second evaporator 52 and a second evaporator connection state in which the first evaporator 51 is positioned on the downstream side of the second evaporator 52 in the refrigerant flow direction in the refrigerant circuit 10c. In one or more embodiments, the second switching portion 62 is constituted by a four-way switching valve that has first to fourth connection ports which are four connection ports, and that can switch the connection state between the connection ports. In the second switching portion 62, the first connection port is connected to a refrigerant pipe extending from the second expansion valve and the second connection port is connected to a refrigerant pipe branching and extending from the middle of a refrigerant flow path connecting the third switching portion 63 and the accumulator 13. In addition, in the second switching portion 62, the third connection port is connected to an end of the first evaporator 51 opposite the end on the second evaporator 52 side, and the fourth connection port is connected to an end of the second evaporator 52 opposite the end on the first evaporator 51 side.

The first air flow path 26 is a flow path in which the first condenser 31 and the first evaporator 51 are arranged in a row in the air flow direction. The air flow in the first air flow path 26 is formed by the first indoor fan 25. In one or more embodiments, the first evaporator 51 is disposed on the upstream side in the air flow direction with respect to the first condenser 31 so as to cover the entire flow path, and the first condenser 31 is disposed on the downstream side in the air flow direction with respect to the first evaporator 51 so as to cover a part of the flow path. The outlet of the first air flow path 26 is opened toward the inside of the vehicle. In one or more embodiments, at least part of the air passing through the outlet of the first air flow path 26 is sent along the inner surface of the windshield of the vehicle. The inlet of the first air flow path 26 communicates with the outside of the vehicle. Thus, fresh air outside the vehicle can be taken into the vehicle through the first air flow path 26 to ventilate the inside of the vehicle. A first shutoff switching portion 33 switches between a state in which it covers the upstream side of the first condenser 31 in the air flow direction to shut off the air flow from touching the first condenser 31 by moving to a position overlapping the first condenser 31 when viewed in the air flow direction and a state in which it allows the air to pass through the first condenser 31 without covering the first condenser 31 by moving to a position not overlapping the first condenser 31 when viewed in the air flow direction.

The second air flow path 28 is a flow path in which the second condenser 32 and the second evaporator 52 are arranged in a row in the air flow direction. The air flow in the second air flow path 28 is formed by the second indoor fan 27. In one or more embodiments, the second evaporator 52 is disposed on the upstream side in the air flow direction with respect to the second condenser 32 so as to cover the entire flow path, and the second condenser 32 is disposed on the downstream side in the air flow direction with respect to the second evaporator 52 so as to cover a part of the flow path. The outlet of the second air flow path 28 is opened toward the inside of the vehicle. The inlet of the second air flow path 28 communicates with the inside of the vehicle separately from the outlet. Thus, the second air flow path 28 can circulate the air in the vehicle. A second shutoff switching portion 34 switches between a state in which it covers the upstream side of the second condenser 32 in the air flow direction to shut off the air flow from touching the second condenser 32 by moving to a position overlapping the second condenser 32 when viewed in the air flow direction and a state in which it allows the air to pass through the second condenser 32 without covering the second condenser 32 by moving to a position not overlapping the second condenser 32 when viewed in the air flow direction.

The controller 7 controls the states of the compressor 11, the first expansion valve 15a, the second expansion valve 15b, the first switching portion 61, the second switching portion 62, the third switching portion 63, the outdoor fan 21, the first indoor fan 25, the second indoor fan 27, the first shutoff switching portion 33, and the second shutoff switching portion 34, all constituting the refrigerant circuit 10c. Further, the controller 7 is connected to an in-vehicle temperature sensor 41 and an outside air temperature sensor 42 and grasps temperatures detected by the respective sensors. The controller 7 includes a processor as a CPU provided for performing control, a memory, and the like.

In the refrigerant circuit 10c described above, the controller 7 controls each device to conduct a refrigeration cycle to thereby perform a cooling operation, a heating operation, and a dehumidification heating operation.

(Cooling Operation)

In the cooling operation, the controller 7 controls the first expansion valve 15a to a fully open state, drives the outdoor fan 21, the first indoor fan 25, and the second indoor fan 27, switches the first shutoff switching portion 33 to block the first condenser 31, switches the second shutoff switching portion 34 to block the second condenser 32, and switches the third switching portion 63 to connect the outdoor heat exchanger 14 and the second expansion valve 15b.

In the above state, the refrigerant discharged from the compressor 11 is sent to the first switching portion 61. In one or more embodiments, the driving frequency of the compressor 11 is controlled so that the compressor 11 can process the heat load of both the first evaporator 51 and the second evaporator 52. The refrigerant that has passed through the first switching portion 61 passes through the first condenser 31 and the second condenser 32 in an order corresponding to the switching state of the first switching portion 61. In one or more embodiments, the first switching portion 61 maintains the switching state immediately before the start of the cooling operation. Since the first condenser 31 is covered with the first shutoff switching portion 33 and the second condenser 32 is covered with the second shutoff switching portion 34, heat dissipation and condensation of the refrigerant are suppressed. The refrigerant that has passed through the first condenser 31 and the second condenser 32 passes through the first switching portion 61 again, then passes through the first expansion valve 15a that is controlled to be in the fully open state, and is sent to the outdoor heat exchanger 14. In the outdoor heat exchanger 14, the refrigerant dissipates heat and condenses by exchanging heat with the air outside the vehicle supplied from the outdoor fan 21. Next, the refrigerant that has passed through the third switching portion 63 is decompressed in the second expansion valve 15b. In one or more embodiments, the valve opening degree of the second expansion valve 15b is controlled such that the degree of superheating of the refrigerant sucked into the compressors 11 satisfies a predetermined condition. The refrigerant decompressed by the second expansion valve 15b is sent to the second switching portion 62. The refrigerant that has passed through the second switching portion 62 passes through the first evaporator 51 and the second evaporator 52 in an order corresponding to the switching state of the second switching portion 62. In one or more embodiments, the second switching portion 62 is switched so that the larger cooling load among the cooling load of the outside air sent to the first evaporator 51 and the cooling load of the circulating air inside the vehicle sent to the second evaporator 52 is positioned on the upstream side in the refrigerant flow direction. For example, when the temperature outside the vehicle is higher than the temperature inside the vehicle, the cooling load of the first evaporator 51 that cools the air outside the vehicle is larger; therefore, the second switching portion 62 is switched so that the first evaporator 51 is positioned on the upstream side of the second evaporator 52. Further, when the temperature inside the vehicle is higher than the temperature outside the vehicle, as a vehicle left outside under the blazing sun, the second switching portion 62 is switched so that the second evaporator 52 is positioned on the upstream side of the first evaporator 51 because the cooling load of the second evaporator 52 for cooling the air inside the vehicle is larger. The temperature outside the vehicle is grasped as a detection value of the outside air temperature sensor 42, and the temperature inside the vehicle is grasped as a detection value of the in-vehicle temperature sensor 41. By the above-described control of the second switching portion 62, the evaporation temperature of the refrigerant in the evaporator for which a larger cooling capacity is required can be made relatively low, and it is possible to cope with the load for which processing is required.

The refrigerant evaporated in the first evaporator 51 and the second evaporator 52 is sucked into the compressor 11 again via the second switching portion 62 and the accumulator 13.

(Heating Operation)

In the heating operation, the controller 7 drives the outdoor fan 21, the first indoor fan 25, and the second indoor fan 27, switches the first shutoff switching portion 33 to a position where the first condenser 31 is not blocked, switches the second shutoff switching portion 34 to a position where the second condenser 32 is not blocked, and switches the third switching portion 63 to a state where the outdoor heat exchanger 14 and the accumulator 13 are connected.

In the above state, the refrigerant discharged from the compressor 11 is sent to the first switching portion 61. In one or more embodiments, the driving frequency of the compressor 11 is controlled so that the compressor 11 can process the heat load of both the first condenser 31 and the second condenser 32. The refrigerant that has passed through the first switching portion 61 passes through the first condenser 31 and the second condenser 32 in an order corresponding to the switching state of the first switching portion 61. During the heating operation, the first condenser 31 is not covered by the first shutoff switching portion 33, and the second condenser 32 is not covered by the second shutoff switching portion 34, so that the refrigerant passing through the first condenser 31 and the second condenser 32 can exchange heat with the air, and the refrigerant is condensed. The first switching portion 61 is switched so that the larger heating load among the heating load of the outside air sent to the first condenser 31 and the heating load of the circulating air inside the vehicle sent to the second condenser 32 is positioned on the upstream side in the refrigerant flow direction. For example, when the temperature outside the vehicle is lower than the temperature inside the vehicle, the first condenser 31 for heating the air outside the vehicle has a larger heating load; therefore, the first switching portion 61 is switched so that the first condenser 31 is positioned on the upstream side of the second condenser 32. When the temperature inside the vehicle is lower than the temperature outside the vehicle, the second condenser 32 for heating the air inside the vehicle has a larger heating load; therefore, the first switching portion 61 is switched so that the second condenser 32 is positioned on the upstream side of the first condenser 31. The temperature outside the vehicle is grasped as a detection value of the outside air temperature sensor 42, and the temperature inside the vehicle is grasped as a detection value of the in-vehicle temperature sensor 41. By the above-described control of the first switching portion 61, the condensation temperature of the refrigerant in the condenser in which more heating capacity is required can be set to be relatively high, and it is possible to cope with the load in which processing is required. The refrigerant condensed by the first condenser 31 and the second condenser 32 is sent to the first expansion valve 15a via the first switching portion 61 and is decompressed. The valve opening degree of the first expansion valve 15a is controlled such that the degree of superheating of the refrigerant sucked by the compressor 11 satisfies a predetermined condition. The refrigerant decompressed by the first expansion valve 15a evaporates, in the outdoor heat exchanger 14, by being heat-exchanged with the air outside the vehicle supplied from the outdoor fan 21. The refrigerant evaporated in the outdoor heat exchanger 14 passes through the third switching portion 63 and the accumulator 13, and is sucked into the compressor 11 again. During the heating operation, the refrigerant does not flow through the first evaporator 51 and the second evaporator 52.

(Dehumidification Heating Operation)

In the dehumidification heating operation, the controller 7 drives the outdoor fan 21, the first indoor fan 25, and the second indoor fan 27, switches the first shutoff switching portion 33 to a position where the first condenser 31 is not blocked, switches the second shutoff switching portion 34 to a position where the second condenser 32 is not blocked, switches the third switching portion 63 to a state where the outdoor heat exchanger 14 and the second expansion valve 15b are connected, and controls the second expansion valve 15b to a fully open state.

In the above state, the refrigerant discharged from the compressor 11 is sent to the first switching portion 61. The compressor 11 and the first switching portion 61 are controlled in the same manner as in the heating operation. The refrigerant condensed by the first condenser 31 and the second condenser 32 is sent to the first expansion valve 15a via the first switching portion 61 and is decompressed. The valve opening degree of the first expansion valve 15a is controlled such that the degree of superheating of the refrigerant sucked by the compressor 11 satisfies a predetermined condition. The refrigerant decompressed by the first expansion valve 15a evaporates, in the outdoor heat exchanger 14, by being heat-exchanged with the air outside the vehicle supplied from the outdoor fan 21. The refrigerant evaporated in the outdoor heat exchanger 14 passes through the third switching portion 63 and the second expansion valve 15b controlled to a fully open state, and is sent to the second switching portion 62. The connection state of the second switching portion 62 is switched so that the first evaporator 51 is disposed on the upstream side of the second evaporator 52. Thus, the evaporation temperature of the refrigerant in the first evaporator 51 can be made lower than the evaporation temperature of the refrigerant in the second evaporator 52, and the humidity of the air taken in from the outside of the vehicle and passing through the first evaporator 51 can be lowered. In such a manner, at least part of the air whose humidity has been reduced by passing through the first evaporator 51 is warmed in the first condenser 31, and is then sent along the inner surface of the windshield inside the vehicle. Thus, it is possible to suppress fogging of the windshield while heating the inside of the vehicle. The refrigerant evaporated in the first evaporator 51 and the second evaporator 52 passes through the second switching portion 62 and the accumulator 13, and is sucked into the compressor 11 again.

(2-1) Modification 2A of Second Example

Figure 6:
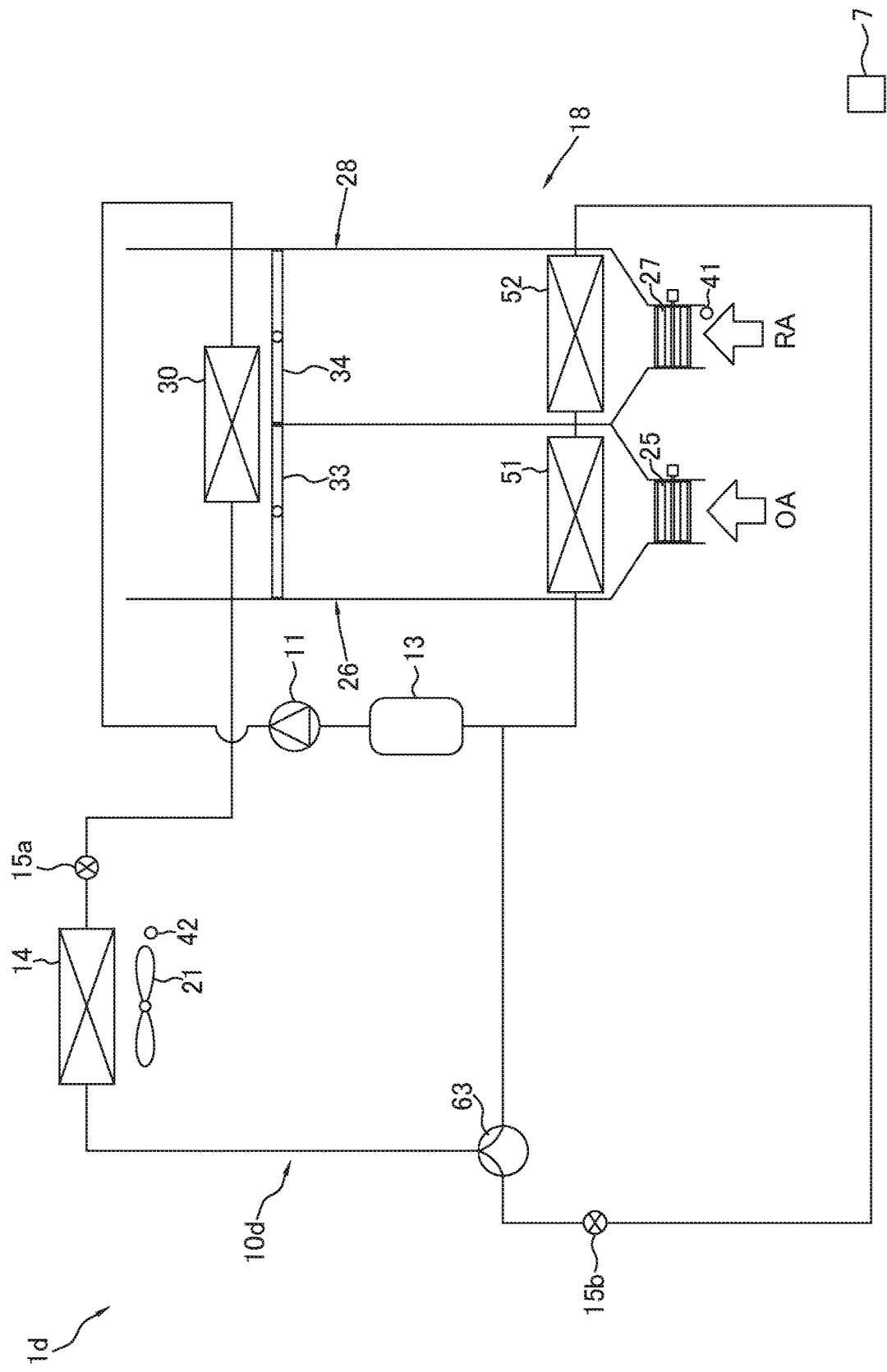
FIG. 6 is an overall configuration diagram of a refrigeration cycle device for a vehicle according to a modification of the second example.

FIG. 6 is a schematic configuration diagram of a refrigeration cycle device for a vehicle 1d according to a modification 2A of the second example.

The refrigeration cycle device for a vehicle 1d is provided with a refrigerant circuit 10d in which, compared with the refrigerant circuit 10c of the refrigeration cycle device for a vehicle 1c of the second example, the first switching portion 61 and the third switching portion 63 are omitted, and the first condenser 31 and the second condenser 32 are integrated into a condenser 30.

In the refrigeration cycle device for a vehicle 1d according to the present modification 2A, although the order in which the refrigerant flows in the plurality of condensers cannot be changed and the order in which the refrigerant flows in the plurality of evaporators cannot be changed, a cooling operation, a heating operation, and a dehumidification heating operation can be performed and a plurality of heat exchangers with different evaporation temperature regions can be effectively used as in the second example.

(3) Other Embodiments (3-1) Example 3A

In each of the above-described embodiments and modifications, the cases where separate heat exchangers, evaporators, and condensers are connected to each other via the refrigerant pipes, such as the first indoor heat exchanger 16 and the second indoor heat exchanger 17, the first condenser 31 and the second condenser 32, or the first evaporator 51 and the second evaporator 52, have been described as examples.

On the other hand, a combination of the heat exchangers, a combination of the evaporators, and a combination of the condensers may be configured to include common heat transfer fins without the refrigerant pipes interposed therebetween. For example, the first indoor heat exchanger 16 and the second indoor heat exchanger 17 may have a plurality of heat transfer fins used in common, the first condenser 31 and the second condenser 32 may have a plurality of heat transfer fins used in common, and the first evaporator 51 and the second evaporator 52 may have a plurality of heat transfer fins used in common. The heat transfer tube included in each heat exchanger, evaporator, and condenser may be a flat multi-hole tube having a plurality of refrigerant flow paths. In such a case, the upstream portion of the flat multi-hole tube may constitute one of the first indoor heat exchanger 16 and the second indoor heat exchanger 17, one of the first condenser 31 and the second condenser 32, or one of the first evaporator 51 and the second evaporator 52, and the downstream portion of the flat multi-hole tube may constitute the other of the first indoor heat exchanger 16 and the second indoor heat exchanger 17, the other of the first condenser 31 and the second condenser 32, or the other of the first evaporator 51 and the second evaporator 52.

(3-2) Example 3B

In each of the above-described embodiments and modifications, the first indoor heat exchanger 16 and the second indoor heat exchanger 17, the first condenser 31 and the second condenser 32, or the first evaporator 51 and the second evaporator 52 may have a plurality of heat transfer tubes arranged in the flow direction of a fluid such as air that exchanges heat with the refrigerant flowing inside the heat transfer tubes. In such a case, in the heat exchanger, the evaporator, and the condenser, the flow direction of the refrigerant and the flow direction of the fluid such as air may be parallel to each other, the flow direction of the refrigerant and the flow direction of the fluid such as air may be opposed to each other, or both the parallel flow directions and the opposed flow directions may coexist. When the refrigerant and the fluid such as air are caused to flow in parallel, it is easy to ensure a large temperature difference between the refrigerant and the fluid such as air, and hence the heat exchanger, the evaporator, or the condenser can have enhanced performance. When the refrigerant and the fluid such as air flow in opposite directions, the entire heat exchanger in the refrigeration cycle device can have enhanced operation efficiency.

Further, by switching the connection states of the utilization-side switching portion 19 of the refrigeration cycle device for a vehicle 1a, the connection states of the three-way valve 19a and the three-way valve 19b of the refrigeration cycle device for a vehicle 1b, and the connection states of the first switching portion 61 and the second switching portion 62 of the refrigeration cycle device for a vehicle 1c, the relationship between the refrigerant flow direction and the flow direction of the fluid such as air can be switched between the parallel flows and the opposed flows. For example, the connection state may be switched to the parallel flows for a while from the start of driving in the vehicle by giving priority to quickly making the temperature environment in the vehicle comfortable, and the connection state may be switched to the opposed flows by giving priority to the operation efficiency when the temperature environment in the vehicle approaches a set temperature or when a predetermined time has elapsed from the start of driving.

(3-3) Example 3C

In each of the above-described embodiments and modifications, the first indoor heat exchanger 16 and the second indoor heat exchanger 17, the first condenser 31 and the second condenser 32, and the first evaporator 51 and the second evaporator 52 have been described by way of example as a set of one that performs heat exchange with the air taken into the inside of the vehicle from the outside of the vehicle and one that performs heat exchange with the circulating air inside the vehicle.

On the other hand, all of the first indoor heat exchanger 16 and the second indoor heat exchanger 17, the first condenser 31 and the second condenser 32, and the first evaporator 51 and the second evaporator 52 may perform heat exchange with the circulating air inside the vehicle, or may perform heat exchange with the air taken into the vehicle from the outside of the vehicle. The magnitude of the heat load required to be processed may be different in each region in the vehicle, and by allocating different regions in the vehicle having different heat loads as the supply destinations to which the air after heat exchange is supplied, processing corresponding to the difference in the heat load can be performed. For example, in a region of the front seat in the vehicle, the temperature tends to rise due to a large windshield or the like receiving a large amount of sunlight, and the cooling load tends to be large; while in a region of the rear seat in the vehicle, the cooling load tends to be relatively small. In such a case, by arranging the heat exchanger, the evaporator, or the condenser connected to the upstream side having a high heat load processing capacity in the flow path corresponding to the region having a high heat load, it is possible to effectively use the region on the upstream side of each heat exchanger, evaporator, or condenser.

(3-4) Example 3D

In each of the above-described embodiments and modifications, the first indoor heat exchanger 16 and the second indoor heat exchanger 17, the first condenser 31 and the second condenser 32, or the first evaporator 51 and the second evaporator 52 may perform air conditioning for a specific area in the vehicle.

Specifically, one and the other of the heat exchangers, one and the other of the evaporators, and one and the other of the condensers may be disposed in different flow paths, and outlets of the flow paths may be directed to different areas in the vehicle.

For example, in each of the above-described embodiments and modifications, the outlet of the first air flow path 16a may be a front seat in the vehicle and the outlet of the second air flow path 17a may be a rear seat in the vehicle, or the outlet of the first air flow path 26 may be a front seat in the vehicle and the outlet of the second air flow path 28 may be a rear seat in the vehicle. In such a case, switching control may be performed such that the heat load grasped from the temperature difference between the air temperature outside the vehicle and the set temperature obtained in the supply target area inside the vehicle is compared with the heat load grasped from the temperature difference between the air temperature inside the vehicle and the set temperature obtained in the supply target area inside the vehicle, and the larger heat load is subjected to heat load processing by the heat exchanger, the evaporator, or the condenser disposed on the downstream side.

(3-5) Example 3E

In each of the above-described embodiments and modifications, the cases where all of the first indoor heat exchanger 16 and the second indoor heat exchanger 17, the first condenser 31 and the second condenser 32, and the first evaporator 51 and the second evaporator 52 are used for air conditioning in the vehicle have been described as examples.

On the other hand, one of the first indoor heat exchanger 16 and the second indoor heat exchanger 17 may be used to adjust the temperature of the battery used in the electric vehicle, and the other may be used to condition the air in the vehicle.

In such a case, the heat exchanger used for the temperature adjustment of the battery many be the heat exchanger having a refrigerant temperature closer to the temperature region suitable for the battery among the heat exchangers disposed on the upstream side and the downstream side.

Others

The refrigeration cycle device for a vehicle according to the fourth aspect may be controlled by a control unit having a processor and the like such that the evaporation temperature of the refrigerant in the first heat exchange portion becomes a first target evaporation temperature and the evaporation temperature of the refrigerant in the second heat exchange portion becomes a second target evaporation temperature higher than the first target evaporation temperature.

The evaporation temperature of the refrigerant in the first heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the first heat exchange portion. The evaporation temperature of the refrigerant in the second heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the second heat exchange portion. Here, when the temperature of the refrigerant flowing through the outlet of the first heat exchange portion is used as the evaporation temperature of the refrigerant in the first heat exchange portion, the evaporation temperature of the refrigerant in the second heat exchange portion may be the temperature of the refrigerant flowing through a portion other than the inlet among the above-described portions in the direction in which the refrigerant flows in the second heat exchange portion.

The refrigeration cycle device for a vehicle according to the fourth aspect may be controlled by a control unit having a processor or the like such that the condensation temperature of the refrigerant in the first heat exchange portion becomes a first target condensation temperature, and the condensation temperature of the refrigerant in the second heat exchange portion becomes a second target condensation temperature lower than the first target condensation temperature.

The condensation temperature of the refrigerant in the first heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the first heat exchange portion. The condensation temperature of the refrigerant in the second heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the second heat exchange portion. Here, when the temperature of the refrigerant flowing through the outlet of the first heat exchange portion is used as the condensation temperature of the refrigerant in the first heat exchange portion, the condensation temperature of the refrigerant in the second heat exchange portion may be the temperature of the refrigerant flowing through a portion other than the inlet among the above-described portions in the direction in which the refrigerant flows in the second heat exchange portion.

It should be noted that the heat load increases as the change width of the temperature of the passing fluid such as air increases and as the flow rate of the passing fluid such as air increases.

The refrigeration cycle device for a vehicle according to the seventh aspect may be controlled by a control unit having a processor and the like such that the evaporation temperature of the refrigerant in the first heat exchange portion becomes a first target evaporation temperature and the evaporation temperature of the refrigerant in the second heat exchange portion becomes a second target evaporation temperature higher than the first target evaporation temperature.

The evaporation temperature of the refrigerant in the first heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the first heat exchange portion. The evaporation temperature of the refrigerant in the second heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the second heat exchange portion. Here, when the temperature of the refrigerant flowing through the outlet of the first heat exchange portion is used as the evaporation temperature of the refrigerant in the first heat exchange portion, the evaporation temperature of the refrigerant in the second heat exchange portion may be the temperature of the refrigerant flowing through a portion other than the inlet among the above-described portions in the direction in which the refrigerant flows in the second heat exchange portion.

The refrigeration cycle device for a vehicle according to the eighth aspect may be controlled by a control unit having a processor or the like such that the condensation temperature of the refrigerant in the first heat exchange portion becomes a first target condensation temperature, and the condensation temperature of the refrigerant in the second heat exchange portion becomes a second target condensation temperature lower than the first target condensation temperature.

The condensation temperature of the refrigerant in the first heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the first heat exchange portion. The condensation temperature of the refrigerant in the second heat exchange portion may be the temperature of the refrigerant flowing through the inlet, the temperature of the refrigerant flowing through the outlet, the temperature of the refrigerant flowing through a predetermined specific position between the inlet and the outlet, or the temperature of the refrigerant flowing through an intermediate position of the flow path between the inlet and the outlet, in the direction in which the refrigerant flows in the second heat exchange portion. Here, when the temperature of the refrigerant flowing through the outlet of the first heat exchange portion is used as the condensation temperature of the refrigerant in the first heat exchange portion, the condensation temperature of the refrigerant in the second heat exchange portion may be the temperature of the refrigerant flowing through a portion other than the inlet among the above-described portions in the direction in which the refrigerant flows in the second heat exchange portion.

For example, one or more embodiments use one of the evaporation temperature of the refrigerant in the first heat exchange portion and the evaporation temperature of the refrigerant in the second heat exchange portion, which is closer to the optimum temperature for the battery of the vehicle, for the temperature adjustment of the battery of the vehicle.

When the heat load of the front seat inside the vehicle is larger than that of the rear seat inside the vehicle, of the first heat exchange portion and the second heat exchange portion, the heat exchange portion located on the upstream side of the flow of the refrigerant may correspond to the front seat inside the vehicle, and, of the first heat exchange portion and the second heat exchange portion, the heat exchange portion located on the downstream side of the flow of the refrigerant may correspond to the rear seat inside the vehicle.

Supplementary Note

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1, 1A, 1B, 1C, 1D refrigeration cycle device
10, 10a, 10b, 10c, 10d refrigerant circuit
16 first indoor heat exchanger (first heat exchange portion)
17 second indoor heat exchanger (second heat exchange portion)
18 indoor heat exchanger (utilization heat exchanger)
19 utilization-side switching portion (switching mechanism)
19a three-way valve (switching mechanism)
19b three-way valve (switching mechanism)
31 first condenser (first heat exchange portion)
32 second condenser (second heat exchange portion)
51 first evaporator (first heat exchange portion)
52 second evaporator (second heat exchange portion)
61 first switching portion (switching mechanism)
62 second switching portion (switching mechanism)
63 third switching portion

What is claimed is:
1. A refrigeration cycle device for a vehicle, comprising:
a refrigerant circuit, in which a zeotropic refrigerant mixture is circulated, comprising a utilization heat exchanger including:
a first heat exchange portion; and
a second heat exchange portion disposed in series with the first heat exchange portion in a direction in which the zeotropic refrigerant mixture flows in the refrigerant circuit, wherein
the first heat exchange portion is disposed on an upstream side of the second heat exchange portion in a direction in which the zeotropic refrigerant mixture flows when the utilization heat exchanger functions as an evaporator of the zeotropic refrigerant mixture, and
when the utilization heat exchanger functions as the evaporator, an evaporation temperature of the zeotropic refrigerant mixture in the first heat exchange portion is lower than an evaporation temperature of the zeotropic refrigerant mixture in the second heat exchange portion.

2. The refrigeration cycle device according to claim 1, wherein the zeotropic refrigerant mixture includes HFO (hydrofluoroolefin) 1123.

3. The refrigeration cycle device according to claim 1, wherein the zeotropic refrigerant mixture includes an HFO (hydrofluoroolefin)-based refrigerant and an HFC (hydrofluorocarbon)-based refrigerant.

4. A refrigeration cycle device for a vehicle, comprising:
a refrigerant circuit, in which a zeotropic refrigerant mixture is circulated, comprising a utilization heat exchanger including:
a first heat exchange portion; and
a second heat exchange portion disposed in series with the first heat exchange portion in a direction in which the zeotropic refrigerant mixture flows in the refrigerant circuit, wherein
the first heat exchange portion is disposed on an upstream side of the second heat exchange portion in a direction in which the zeotropic refrigerant mixture flows when the utilization heat exchanger functions as an evaporator of the zeotropic refrigerant mixture, and one of the first and second heat exchange portions that has the larger heat load to be treated is disposed on an upstream side of a flow of the zeotropic refrigerant mixture.

5. The refrigeration cycle device according to claim 4, wherein
the one of the first and second heat exchange portions performs heat exchange between air taken into the vehicle from outside of the vehicle and the zeotropic refrigerant mixture, and
the other of the first and second heat exchange portions performs heat exchange between air circulated inside the vehicle and the zeotropic refrigerant mixture.

6. A refrigeration cycle device for a vehicle comprising:
a refrigerant circuit, in which a zeotropic refrigerant mixture is circulated, comprising a utilization heat exchanger including:
a first heat exchange portion;
a second heat exchange portion; and
a switch that switches the refrigerant circuit between a first state and a second state, wherein
in the first state, the first heat exchange portion is disposed on an upstream side of the second heat exchange portion in a flow of the zeotropic refrigerant mixture,
in the second state, the second heat exchange portion is disposed on an upstream side of the first heat exchange portion in a flow of the zeotropic refrigerant mixture, and
the switch switches into the first state when the utilization heat exchanger functions as an evaporator of the zeotropic refrigerant mixture and is controlled such that an evaporation temperature of the zeotropic refrigerant mixture in the first heat exchange portion is lower than an evaporation temperature of the zeotropic refrigerant mixture in the second heat exchange portion.

7. The refrigeration cycle device according to claim 6, wherein the switch is switched such that one of the first and second heat exchange portions that has the larger heat load required to be treated is disposed on an upstream side of a flow of the zeotropic refrigerant mixture.

8. A refrigeration cycle device for a vehicle comprising:
a refrigerant circuit, in which a zeotropic refrigerant mixture is circulated, comprising a utilization heat exchanger including:
a first heat exchange portion;
a second heat exchange portion; and
a switch that switches the refrigerant circuit between a first state and a second state, wherein
in the first state, the first heat exchange portion is disposed on an upstream side of the second heat exchange portion in a flow of the zeotropic refrigerant mixture,
in the second state, the second heat exchange portion is disposed on an upstream side of the first heat exchange portion in a flow of the zeotropic refrigerant mixture, and
the switch switches into the first state when the utilization heat exchanger functions as a condenser of the zeotropic refrigerant mixture and is controlled such that a condensation temperature of the zeotropic refrigerant mixture in the first heat exchange portion is higher than a condensation temperature of the zeotropic refrigerant mixture in the second heat exchange portion.

9. A refrigeration cycle device for a vehicle, comprising:
a refrigerant circuit, in which a zeotropic refrigerant mixture is circulated, comprising a utilization heat exchanger including:
a first heat exchange portion; and
a second heat exchange portion disposed in series with the first heat exchange portion in a direction in which the zeotropic refrigerant mixture flows in the refrigerant circuit, wherein
the first heat exchange portion is disposed on an upstream side of the second heat exchange portion in a direction in which the zeotropic refrigerant mixture flows when the utilization heat exchanger functions as an evaporator of the zeotropic refrigerant mixture,
one of the first and second heat exchange portions is used for air-conditioning inside of the vehicle, and
the other of the first and second heat exchange portions is used for adjusting a temperature of a battery.

10. A refrigeration cycle device for a vehicle, comprising:
a refrigerant circuit, in which a zeotropic refrigerant mixture is circulated, comprising a utilization heat exchanger including:
a first heat exchange portion; and
a second heat exchange portion disposed in series with the first heat exchange portion in a direction in which the zeotropic refrigerant mixture flows in the refrigerant circuit, wherein
the first heat exchange portion is disposed on an upstream side of the second heat exchange portion in a direction in which the zeotropic refrigerant mixture flows when the utilization heat exchanger functions as an evaporator of the zeotropic refrigerant mixture,
one of the first and second heat exchange portions is used for air-conditioning a front seat inside a vehicle, and
the other of the first and second heat exchange portions is used for air-conditioning a rear seat inside the vehicle.

11. A refrigeration cycle device for a vehicle, comprising:
a refrigerant circuit, in which a zeotropic refrigerant mixture is circulated, comprising a utilization heat exchanger including:
a first heat exchange portion; and
a second heat exchange portion disposed in series with the first heat exchange portion in a direction in which the zeotropic refrigerant mixture flows in the refrigerant circuit, wherein
the first heat exchange portion is disposed on an upstream side of the second heat exchange portion in a direction in which the zeotropic refrigerant mixture flows when the utilization heat exchanger functions as an evaporator of the zeotropic refrigerant mixture, and
the zeotropic refrigerant mixture includes HFO (hydrofluoroolefin) 1132.

* * * * *